United States Patent [19]

Ghose

[11] Patent Number: 4,670,806
[45] Date of Patent: Jun. 2, 1987

[54] SELF LOADING SLIDER FOR MAGNETIC RECORDING HEADS

[75] Inventor: Sanjoy Ghose, Santa Cruz, Calif.

[73] Assignee: Memorex Corporation, Santa Clara, Calif.

[21] Appl. No.: 130,300

[22] Filed: Mar. 14, 1980

[51] Int. Cl.[4] .................. G11B 5/60; G11B 15/64; G11B 17/32
[52] U.S. Cl. .................................................. 360/103
[58] Field of Search .................. 360/103, 102, 122

[56] References Cited

U.S. PATENT DOCUMENTS 4,218,715  8/1980  Garnier ........................ 360/122 X

FOREIGN PATENT DOCUMENTS 54-1011   1/1979  Japan ................................. 360/103
55-12542  1/1980  Japan ................................. 360/103
617783    7/1978  U.S.S.R. ........................... 360/103
669395    5/1979  U.S.S.R. ........................... 360/103

OTHER PUBLICATIONS

IBM/TDB, vol. 22, No. 1, Jun. 1979, p. 333, "Self-loading Slider" by Watrour.

Primary Examiner—John H. Wolff
Attorney, Agent, or Firm—Malcolm B. Wittenberg

[57] ABSTRACT

A slider for flying a magnetic head on a fluid bearing above moving magnetic recording media is disclosed in which a fluid bearing surface includes a generally planar fluid support surface extending generally transverse to the direction of movement of the media, a ramped leading edge and a cavity having a generally spherical surface formed in the fluid support surface and spaced from the leading edge thereof. A method of making such a slider is also disclosed.

2 Claims, 10 Drawing Figures

SELF LOADING SLIDER FOR MAGNETIC RECORDING HEADS

BACKGROUND OF THE INVENTION

This invention relates to a slider for flying a magnetic head on a fluid bearing relative to moving magnetic recording media, and in particular to a self-loading slider.

Magnetic head assemblies, comprising sliders carrying magnetic transducers, are widely and extensively used in magnetic recording apparatus, particularly disc recording apparatus. Various types of head/slider arrangements that fly on a fluid or air bearing film over the moving recording media surface are well known in the art. In order to maximize the density of stored data on such magnetic discs, the flying height of the transducer above the media is made as small as is practical, with the requirement that a substantially constant height be maintained. Conventionally, the sliders are designed such that they experience, from their support arms, a constant pressure toward the disc surface, with the lifting force of the air bearing serving to hold the slider and transducer away from the disc surface the desired amount when the disc is rotating.

Among the various types of known slider configurations are those of Garnier et al. U.S. Pat. No. 3,855,625, Roscamp et al. U.S. Pat. No. 4,081,846 and the trimaran structure of Warner U.S. Pat. No. 3,823,416.

One type of slider which has been developed and which may possess some self-loading characteristic is that shown in the Garnier et al. patent. This slider, having what is known as a taper-flat configuration with a ramped portion at the leading edge and two air bearing rails extending therefrom to the trailing edge with a rectangular recess therebetween, has provided satisfactory operation in many respects. The structure is substantially self-loading in that the rectangular recess provides a low pressure area to counteract some of the lift provided by the air bearing side rails such that the device tends to fly a distance above the moving media surface which can be controlled by the relationship between the rectangular recess and the fluid bearing rails. However, the Garnier et al. structure possesses several major disadvantages both in fabrication and in operation. Since the recessed area of that structure is rectangular and is enclosed on three sides by walls, fabrication of the device requires surface etching to produce the necessary configuration. The requirement for such etching severely restricts the types of material that can be used for manufacturing such sliders, since not all materials are susceptible of precisely controlled etching. Additionally, the sharp edges of the recessed cavity, which edges are substantially perpendicular to the air bearing surface, act as collectors of dust, debris and foreign material. A build-up of such material in this cavity can change the operating conditions of the slider and head assembly significantly.

Even the slider configurations of Roscamp et al. and Warner require expensive processes such as grinding and lapping within confined areas between side rails. Such requirements not only increase the manufacturing costs but also may have adverse effects upon the production yield.

SUMMARY OF THE INVENTION

The present invention provides a slider which overcomes many of the disadvantages of the prior art devices. It is an object of this invention to provide a novel and improved slider for flying a magnetic head at a substantially constant spacing from the moving magnetic media during operation.

It is another object of this invention to provide a slider which is substantially self-loading.

A further object is to provide such a slider which is easy and economical to manufacture.

To achieve the foregoing, as well as other objects which will become apparent below, the present invention provides a slider for flying a magnetic head on a fluid bearing relative to magnetic recording media moving in a predetermined direction, which slider includes a slider body having structure defining a fluid bearing surface with leading and trailing edges, the fluid bearing surface structure further including a generally planar fluid support surface extending generally transverse to the predetermined direction of movement of the media, a portion of the slider leading edge defining a ramp angled away from the plane of the fluid support surface and the media, and a cavity having a generally spherical surface formed in the fluid support surface and spaced from the leading edge, whereby the spherical cavity may serve to create a reduced pressure area having predetermined characteristics on the fluid bearing surface when the sliders flying above the moving media to cause the sliders to fly very closely to the moving recording media at a substantially constant height. A method of fabricating such a slider from a block of rigid material is also provided, including the steps of forming a concave, spherically curved surface in one surface of the block, removing portions of that spherical surface to form a generally flat, or planar, surface surrounding at least a portion of the periphery of the remaining spherical surface, and forming a ramp surface away from the plane of the flat surface and toward one predetermined edge of the block which is defined as the leading edge.

The present invention provides for a simple and straightforward manufacturing process and the formation thereby of a slider whose flying characteristics may be easily and carefully controlled during manufacture.

BRIEF DESCRIPTION OF THE DRAWINGS

The invention will be described in greater detail below with reference to the drawings in which.

DESCRIPTION OF A PREFERRED EMBODIMENT

Figure 1:
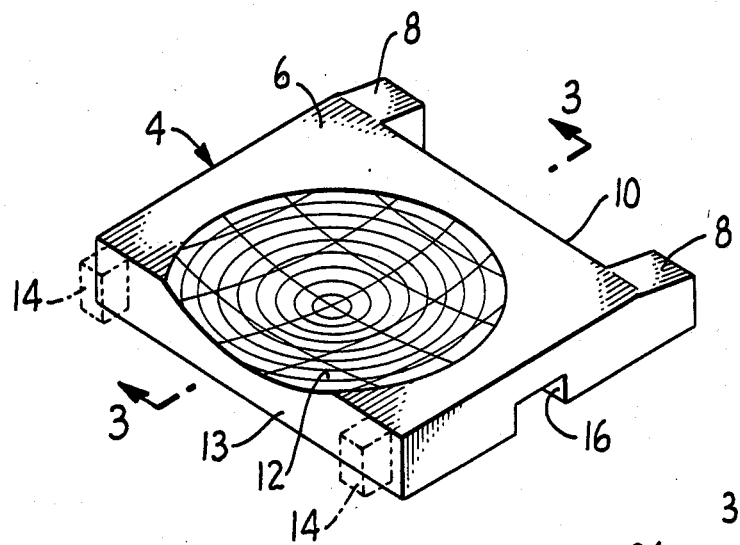
FIG. 1 is a perspective view of the slider of the present invention.
Figure 4:
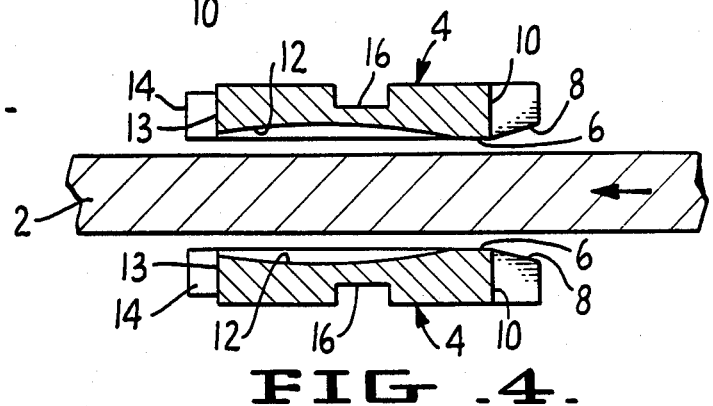
FIG. 4 is a sectional view, similar to FIG. 3, illustrating the relationship between two such sliders and disc recording media.
Figure 5:
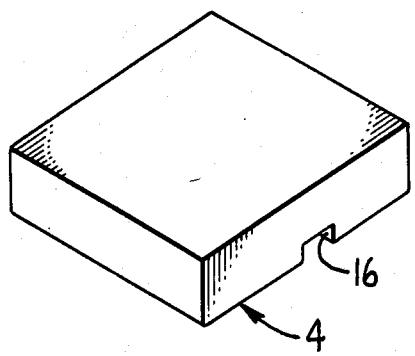
FIGS. 5 through 10 are perspective views of the device of FIG. 1 illustrating the basic steps during a preferred method of manufacture.

A particularly preferred embodiment of the slider of the present invention is illustrated in the perspective view of FIG. 1, with a schematic representation of the relationship of a pair of such sliders to moving recording media being shown in the sectional view of FIG. 4. The relative movement between the recording media 2, which may suitably be a double faced recording disc, and the slider body 4, such movement being indicated by the arrow on the media in FIG. 4, serves to define the leading and trailing edges of the slider.

As shown most clearly in FIG. 1, the slider body 4 includes on one broad surface thereof a generally flat or planar surface 6 extending generally transverse to the direction of movement of the media 2. This planar surface forms a fluid support surface in a manner to be described below. In this preferred embodiment, a portion of the leading edge of the slider body 4 comprises a pair of ramp surfaces 8 angled away from the plane of the fluid support surface 6 and, in FIG. 4, away from the media 2. These ramp portions 8 preferably are in the form of a pair of projections extending forward of the other portions 10 of the slider leading edge. Thus, it may be seen that the ramp portions 8 and the fluid support surface 6 generally define a combination known in the art as a taper-flat surface.

Spaced from the leading edge of the slider body 4 in the slider fluid support surface is a cavity 12 having a generally spherical surface. This cavity may suitably have a spherical radius of about 8 inches, forming a cavity having a typical depth suitably on the order of about 500 microinches below the plane of the fluid support surface 6. The cross hatching shown within the generally spherical cavity 12 of FIG. 1 is included solely for illustrating the generally spherical nature of that cavity and does not represent marking or scoring on an actual item.

To provide for the desired operation of this slider, the generally spherical cavity 12 is dimensioned and positioned with respect to the slider such that it has an opening into the slider trailing edge 13, so that fluid within the cavity may be exhausted through the trailing edge opening, in a manner to be described below.

Although they form no part of this present invention, a pair of magnetic transducers 14, suitably of conventional and well-known construction, are schematically illustrated in phantom as extending outwardly from the trailing edge 13 of the slider, simply to illustrate the general relationship between the slider and the transducers. Additionally, a conventional mounting slot 16 may be formed on the other broad surface on the side of the transducer body 4 opposite from the fluid support surface 6. This slot 16 may be utilized in the conventional manner for mounting As previously noted, the slider of this invention is utilized for flying magnetic recording heads, such as those schematically indicated as items 14 on the drawings, a small, predetermined distance above the surface of moving magnetic recording media, such as disc 2 of FIG. 4. It is to be understood that FIG. 4 is merely a schematic illustration of the general relationship between the sliders 4 and the media 2, and the distances and sizes are distorted to illustrate more clearly the functional relationships. It is also to be understood that the term "above" the surface of the media is intended to mean merely spaced from the media surface, since the sliders may be utilized with either the upwardly or downwardly facing surfaces of the media, as illustrated in FIG. 4.

The configuration of the slider of this invention thus provides for both fluid bearing support of the slider and head assembly, and also self-loading to a predetermined height. This is accomplished by the lift or support provided by the fluid bearing support surface 6 and ramps 8 cooperating with the film of fluid, such as air, entrained with the moving surface of the recording media 2 to lift the slider above the surface of the media. To maintain the flying height at a predetermined, desired level, the spherical cavity 12 opening to the trailing edge of the slider serves to create a reduced or negative pressure area of predetermined characteristics to counteract a portion of the lift generated by the support surfaces 6 and 8.

Figure 2:
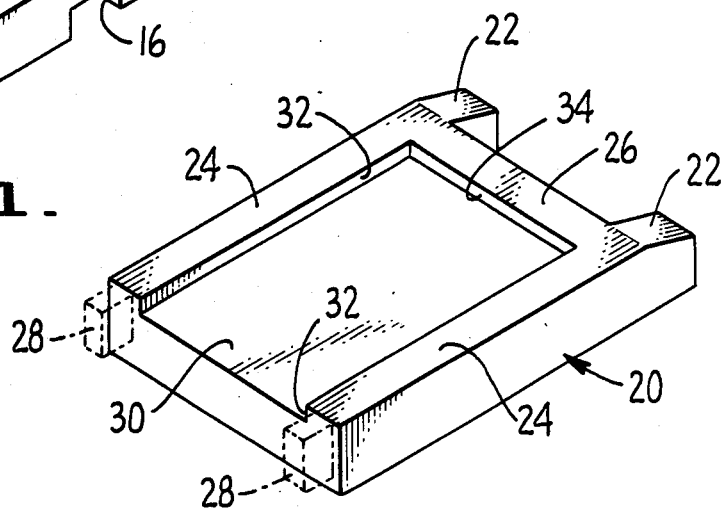
FIG. 2 is a perspective view of a known prior art slider.
Figure 3:
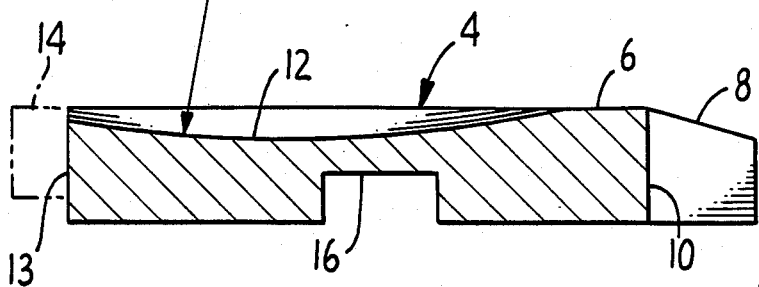
FIG. 3 is a sectional view, at an enlarged scale, taken along line 3—3 of the slider of FIG. 1.

Functionally, the slider of this invention operates in a manner generally similar to that of the prior art, illustrated in FIG. 2. This prior art slider 20 is of the conventional, taper-flat configuration with ramps 22 leading into air bearing support side rails 24 which run the length of the slider. At the leading edge of the slider a cross rail 26 extends between the two side rails 24. Suitable magnetic transducers 28, schematically illustrated in phantom, are provided at the trailing edge of the transducer.

In this prior art slider 20 the flying height is controlled by the provision of a rectangular cavity 30 bounded on three sides by the side rails 24 and the cross rail 26. This cavity 30, generally formed by various etching techniques, is disadvantageous in that the manufacturing processes form side walls 32 and 34 between the base of the cavity 30 and the side rails 24 and transverse rail 26, which side walls are generally perpendicular to the surfaces of the side rail and transverse rail. The abrupt break between the fluid bearing support surfaces and the side walls, as well as the corners at the leading edge of the recess 30 have tended to trap dust and debris and to make continued control of the flying height difficult. As noted above, the necessity for forming such a structure by etching has also limited the materials from which the slider could be fabricated and has complicated the manufacturing process.

A suitable and preferred method of fabricating the slider of the present invention is illustrated in the sequential steps of FIGS. 5 through 10.

Initially, a blank block of material, which may be ferrite, ceramic, or any other appropriate material, may be formed, suitably of a rectangular or square configuration. In the blanking process the mounting slots 16 may also be formed if desired.

Figure 6:
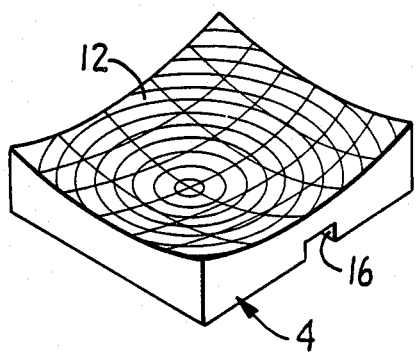

Next, as illustrated in FIG. 6, a concave, spherically curved surface having a predetermined spherical radius may be formed on the broad surface of the blank opposite the surface having slot 16. This concave surface may be produced by conventional and well known lapping techniques, such as are utilized in lens making and other applications. This process may suitably form a spherically curved cavity having an appropriate predetermined center and radius of curvature, with the cavity extending across all portions of that desired surface.

Figure 7:
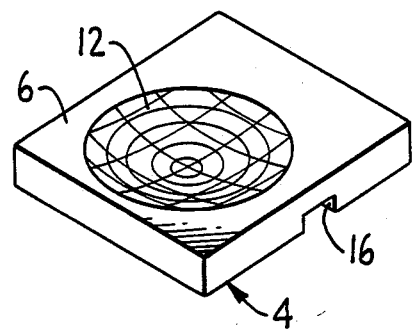

After formation of the appropriate spherically curved surface, portions of that surface may be removed, as by conventional flat lapping, to form a generally flat or planar surface 6 surrounding at least portions of the periphery of the remaining spherical surface 12. In the preferred embodiment the original slider blank is made somewhat oversized so that the flat surface 6 surrounds substantially the entire periphery of the spherically curved surface 12, as shown in FIG. 7.

Figure 8:
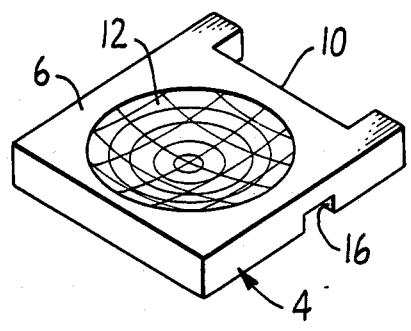

As a succeeding step, portions of the leading edge of the slider blank may be cut away, as illustrated in FIG. 8. This step is not absolutely necessary, since, alternatively, the leading edge of the slider block 4 could have been relieved during the blanking process of the original block of slider material.

Figure 9:
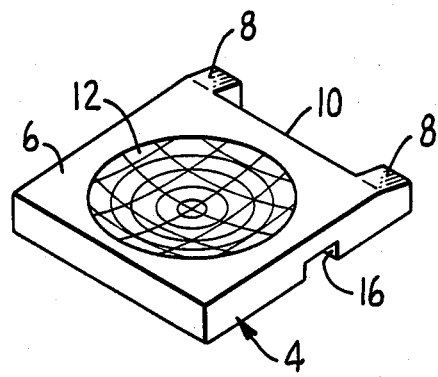
Figure 10:
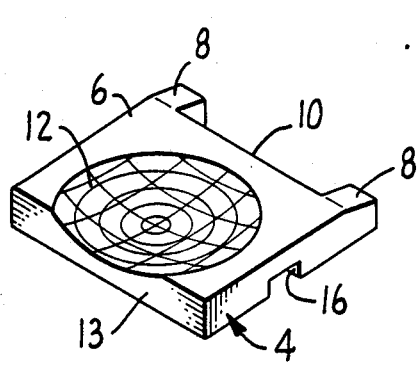

In the next step the taper is ground and lapped onto the ramp portions 8 which form the projections on the leading edge of the slider block, as shown in FIG. 9.

In this preferred embodiment, in which the blank of slider material was initially made oversized, a portion of the trailing edge of the block is removed, suitably by conventional dicing techniques, to provide for the final sizing of the slider and also to provide for the appropriate opening of the spherically curved cavity 12 through the trailing edge. As noted above, it is also possible that this step could be obviated by sizing the original blank more closely to the final dimensions desired so that the spherically curved cavity 12 would have the appropriate opening through the trailing edge after the flat lapping step illustrated in FIG. 7.

The advantages of the foregoing manufacturing method for fabricating the slider may now be seen. Instead of requiring, as the prior art devices of this nature do, that the material be capable of etching, it is only necessary that relatively simple and straightforward spherical and flat lapping techniques be used. Additionally, the very shallow angle between the edges of the cavity 12 and the support surface 6 serves to reduce or eliminate the contamination problem experienced with the etched, prior art devices. All of these characteristics serve to provide a slider which not only has desirable operating characteristics, but also which is susceptible of economical manufacture.

While the foregoing detailed explanation describes the invention with respect to one particularly preferred embodiment and a particularly preferred sequence of manufacturing steps, it is to be recognized that numerous variations on both the configuration and manufacturing method, all within the scope of the invention, will readily occur to those skilled in the art. Accordingly, the foregoing description is to be considered only as illustrative of the principles of the invention and is not to be considered limitative thereof. The scope of the invention is to be limited solely by the claims appended hereto.

I claim:

1. A slider for flying a magnetic head on a fluid bearing relative to magnetic recording media moving in a predetermined direction in the fluid, comprising
    a slider having means defining a fluid bearing surface having leading and trailing edges for flying above the moving media, the fluid bearing surface defining means comprising
    a generally planar fluid support surface extending generally transverse to the predetermined direction of movement of said media;
    a portion of said slider leading edge defining a ramp angled away from the plane of said fluid support surface and said media; and
    a cavity having a generally spherical surface formed in said fluid support surface and spaced from said leading edge while being positioned adjacent said sliding trailing edge wherein said spherical cavity has an opening into said slider trailing edge, whereby fluid within the cavity may be exhausted through the trailing edge opening so that the spherical cavity may serve to create a controlled reduced pressure area on the fluid bearing surface when the slider is flying above the moving media to maintain the slider at a close and substantially constant distance from the media.

2. A slider for flying a magnetic head on a fluid bearing relative to magnetic recording media moving in a predetermined direction in the fluid, comprising
    a slider body having means defining a fluid bearing surface having leading and trailing edges for flying above the moving media, the fluid bearing surface defining means comprising
    a generally planar fluid support surface extending generally transverse to the predetermined direction of movement of said media;
    a portion of said slider leading edge defining a ramp angled away from the plane of said fluid support surface wherein said ramp portion of said slider leading edge comprises a pair of projections extending forward of the other portions of said slider leading edge; and
    a cavity having a generally spherical surface formed in said fluid support surface and spaced from said leading edge while being positioned adjacent said sliding trailing edge, whereby the spherical cavity may serve to create a controlled reduced pressure area on the fluid bearing surface when the slider is flying above the moving media to maintain the slider at a close and substantially constant distance from the media.

* * * * *